April 5, 1960
W. B. PESTER ET AL
2,931,115
SLIDE MAGAZINE
Filed May 16, 1957
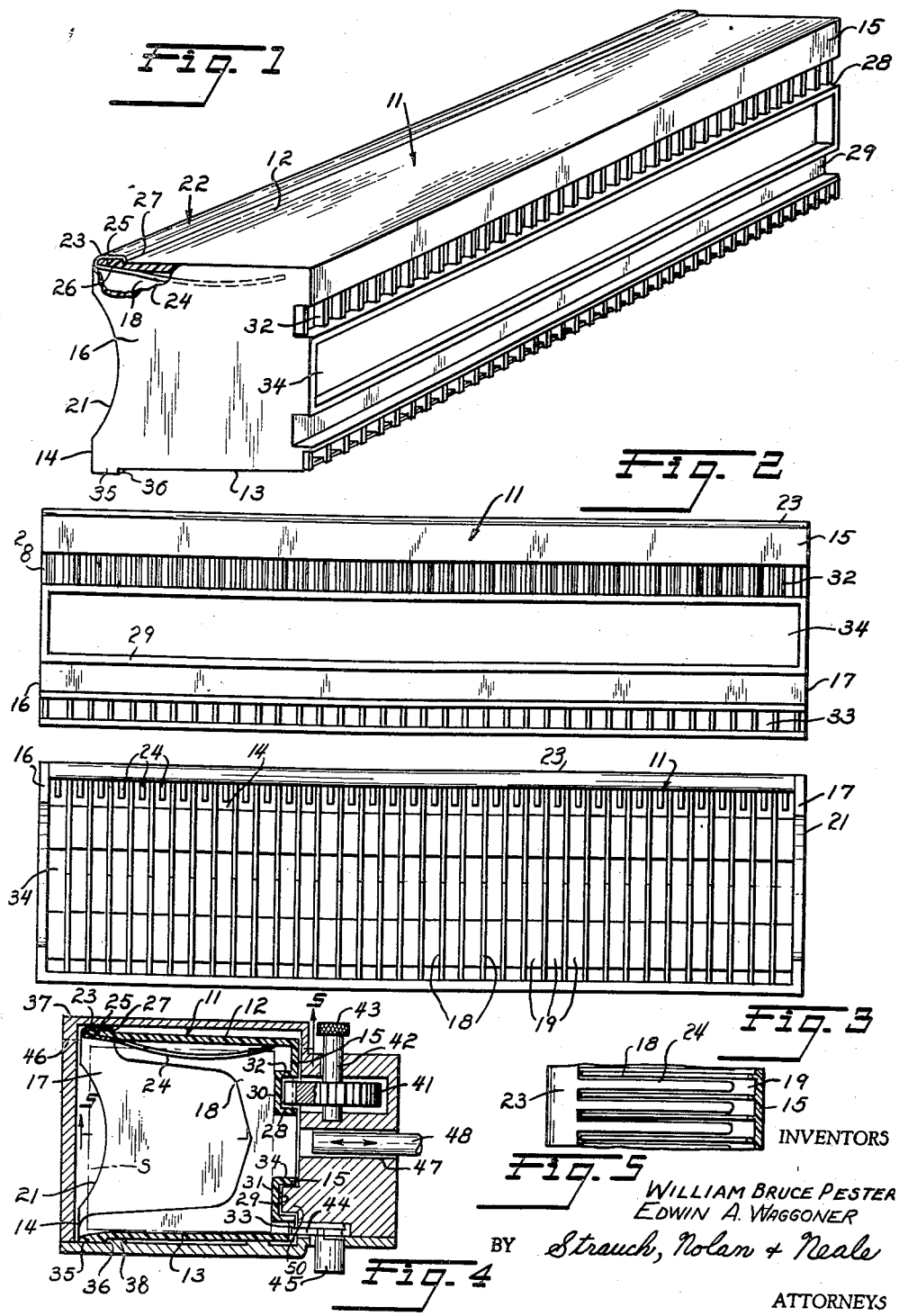
INVENTORS
WILLIAM BRUCE PESTER
EDWIN A. WAGGONER
BY Strauch, Nolan + Neale
ATTORNEYS

United States Patent Office 2,931,115
Patented Apr. 5, 1960

2,931,115

SLIDE MAGAZINE

William Bruce Pester, Ypsilanti, and Edwin A. Waggoner, Ann Arbor, Mich., assignors, by mesne assignments, to Sylvania Electric Products Inc., Wilmington, Del., a corporation of Delaware Application May 16, 1957, Serial No. 659,640

5 Claims. (Cl. 40—79)

This invention relates to magazines for mounting and storing slides such as the well known 35 mm. Kodachrome transparencies, and is particularly directed to a novel magazine control and guide structure.

The major object of the invention is to provide a novel slide carrying magazine that has a special dual rack and guide structure for coaction with an associated projector.

A further object of the invention is to provide a slide carrying magazine having at one side longitudinal rows of rack teeth and a longitudinal guide groove.

It is another object of the invention to provide a compartmented slide mounting magazine having a special spring arrangement for retaining the slides in the individual compartments.

Further objects of the invention will appear as the description proceeds in connection with the appended claims and the annexed drawing wherein:

Figure 1 is a perspective view of a slide mounting magazine according to a preferred embodiment of the invention partially broken away and sectioned to show the slide retainer spring;

Figure 2 is a side elevation of the magazine showing the dual rack and guide structure;

Figure 3 is an opposite side elevation of the magazine showing the compartments;

Figure 4 is a section showing the magazine mounted in a suitable projector assembly for disposing the slides for automatic exhibition; and Figure 5 is a section on line 5—5 of Figure 4 further showing the slide retainer spring.

The magazine 11 is integrally molded of hard plastic material that provides rigidity with lightweight. It is essentially rectangular in cross section with, considering it in the normal use position in a projector, flat parallel top and bottom walls 12 and 13, an open side 14 and a mainly closed drive and guide side 15. The opposite end walls 16 and 17 close the magazine, and a series of equally spaced transverse parallel inner walls 18 divide the interior of the magazine into a desired number of, usually about thirty-six, slide receiving compartments 19.

As shown in Figure 4 the end walls are essentially full closures except for a notch 21 that enables a slide to be gripped, and the walls 18 are of such size as to define compartments 19 in the shape of channels along the top, closed side and bottom walls of the magazine.

A spring unit 22 consisting of J-shaped base 23 extending substantially the length of the magazine and a series of flat bowed fingers 24, one for each compartment 19, is mounted on the magazine. This mounting comprises a thickened rim 25 along the open edge of wall 12, and base 23 which is a continuous strip of bendable spring metal is clenched tightly over rim 25, suitable rivets or screws being provided if desired. As shown in Figures 1 and 4 the thick rim 25 provides a ledge at 26 and the base 23 has its edge bent thereover to provide a holding flange 27. The flat spring fingers 24 which are formed by cutting out strips from a blank plate of spring metal are integral with base 23 and bowed away from wall 12 as they lie within the respective compartments 19. These are compression springs that compress toward wall 12 upon insertion of a slide into the compartment and frictionally hold the slide there against accidentally dropping out or other unwanted displacement.

Fingers 24 therefore provide light springs locating and holding the slides in the individual compartments of the magazine.

At the closed side of the magazine two longitudinal parallel outwardly open flat-sided grooves 28 and 29 are formed. The surfaces 30 and 31 within the magazine are aligned parallel flat faces that seat the bottoms of slides inserted through the open side of the magazine.

A longitudinal row of rack teeth 32 are integrally formed along groove 28, but the walls of groove 29 are smooth to function as locating and guide surfaces as will appear. Since groove 29 is closer to bottom wall 13 than top wall 12 only one orientation of the magazine is possible during insertion. A second longitudinal row of rack teeth 33 parallel to row 32 is formed integrally along the lower edge of wall 15 just below open groove 29. Between grooves 29 and 30 the wall 15 is formed with an opening 34 that preferably extends the entire length between end walls 16 and 17.

The open edge of wall 13 is also formed with a thickened rim 35 along its entire length providing a continuous shoulder 36 for a purpose to appear.

In use and operation the slides S are inserted through the open side of the magazine until they bottom on faces 30, 31 and they are frictionally retained by compressed spring 24. The magazine is now longitudinally slidably inserted endwise into a tunnel illustrated at 37. The tunnel comprises a bottom wall formed with a longitudinal rib 38 that engages magazine shoulder 36 to locate the magazine laterally in the tunnel, and has a spaced longitudinal rib 39 supporting and slidably guiding the wall 13. By providing two flat guide ribs 38 and 39 friction between the magazine and tunnel is reduced and an accurate height location of the magazine is attained.

The upper rack teeth 32 mesh with a gear 41 on a freely rotatable vertical spindle 42. The knob 43 on spindle 42 is accessible for manual control to readily shift the magazine lengthwise along the tunnel.

The lower rack teeth mesh with a suitable one-way drive pawl 44 carried on a shaft 45 that is intermittently operated by a power source (not shown). The shaft 45 and pawl 44 provide for automatic periodic shift of the magazine along the tunnel during automatic projector operation.

One side of the tunnel is apertured as at 46 to permit a slide S to be displaced out of the magazine (to the left in Figure 4) and then back into the magazine during a projection cycle. The other side of the tunnel has an opening 47 permitting a slide pusher member 48 to reciprocate into and through magazine opening 34 to thrust a slide into projection position and then withdraw.

The pusher 48, the mechanism for operating shaft 45 and the means to return the slide from the projection position to the magazine are all operatively connected for synchronous operation, for example so that pusher 48 is not in the magazine when pawl 44 is indexing the magazine to line up the next compartment and slide with opening 46, but these are not part of the present invention and may be accomplished in various ways.

As shown best in Figure 4, upon properly oriented endwise insertion of the magazine into the tunnel its rack teeth engage with the gear 41 and pawl 44 respectively and guide groove 29 fits snugly and slidably upon and along a similarly shaped stationary guide rib 50 that is rigid with the tunnel structure.

The invention may be embodied in other specific forms without departing from the spirit or essential characteris-

What is claimed and desired to be secured by United States Letters Patent is:

1. A slide mounting and carrying magazine comprising an elongated internally compartmented structure having an open side through which slides may be introduced into or withdrawn from the compartments, means on the side opposite said open side providing two parallel longitudinal rows of rack teeth for coaction respectively with manual and automatic magazine moving means on a projector assembly, and longitudinal slide pusher opening means in said opposite side.

2. In the magazine defined in claim 1, an open-ended outwardly open slide guide groove in said opposite side disposed between and parallel to said rows of rack teeth.

3. In combination, an integral slide mounting and carrying magazine having an open side spanned by a series of parallel transverse partitions dividing it into slide receiving compartments, two longitudinal rows of external rack teeth formed integrally on the magazine wall structure, a support structure on which said magazine is adapted to be slidably mounted, means on said support structure rotatably mounting a gear meshed with one of said rows of rack teeth and having a projecting manual actuating handle, and power driven means on said support structure for engaging the other row of said rack teeth.

4. In the combination defined in claim 3, said support structure being a tunnel in which said magazine is longitudinally slidable, said power driven means projecting into said tunnel at the floor thereof, and said row of rack teeth engaged by said manually rotatable gear being formed on the side of the magazine opposite said open side.

5. In a slide mounting and carrying magazine of generally rectangular configuration having an open longitudinal side and a series of transverse partitions dividing the interior thereof into individual slide receiving compartments, parallel magazine walls extending from said open side and a magazine wall joining the ends of said parallel walls opposite said open side, and means for resiliently maintaining the slides in the respective compartments comprising a series of bowed spring fingers extending along one of said parallel walls one within each compartment, and a longitudinal mounting strip rigid with the outer ends of said fingers secured along the edge of said one parallel wall at said open side of the magazine, said strip being integral with said fingers and of bendable material and being bent to clench upon both sides of said edge of said one parallel wall, said one parallel wall edge being thickened to define an external shoulder facing away from the open side of the magazine, and said strip having an end flange bent over said shoulder.

References Cited in the file of this patent

UNITED STATES PATENTS

| | | |
|---|---|---|
| 2,427,164 | Stechbart | Sept. 9, 1947 |
| 2,590,492 | Bennett et al. | Mar. 25, 1952 |
| 2,711,602 | Wiklund | June 28, 1955 |
| 2,724,989 | Badalich | Nov. 29, 1955 |
| 2,756,630 | Goldberg | July 31, 1956 |

FOREIGN PATENTS

| | | |
|---|---|---|
| 319,726 | Germany | Mar. 25, 1919 |

OTHER REFERENCES

Publication of Pamphlet, "Yankee Photo Products," Feb. 15, 1957, 88-28B.

Publication Pamphlet of "Kindermann & Co.," Mar. 25, 1957, 88-28B.